United States Patent
Park et al.

(10) Patent No.: US 9,609,633 B2
(45) Date of Patent: Mar. 28, 2017

(54) METHOD FOR COMMUNICATING DATA USING BANDWIDTH REQUEST CHANNEL, USER EQUIPMENT AND BASE STATION CONDUCTING THE SAME

(71) Applicant: ELECTRONICS AND TELECOMMUNICATIONS RESEARCH INSTITUTE, Daejeon (KR)

(72) Inventors: Hyeong Sook Park, Daejeon (KR); Jun Woo Kim, Daejeon (KR); Youn Ok Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 156 days.

(21) Appl. No.: 14/609,940

(22) Filed: Jan. 30, 2015

(65) Prior Publication Data

US 2015/0230251 A1 Aug. 13, 2015

(30) Foreign Application Priority Data

Feb. 12, 2014 (KR) ........................ 10-2014-0015818

(51) Int. Cl.
*H04W 72/04* (2009.01)
*H04W 74/08* (2009.01)

(52) U.S. Cl.
CPC .... *H04W 72/0413* (2013.01); *H04W 74/0866* (2013.01)

(58) Field of Classification Search
CPC ................... H04W 72/04134; H04W 74/0866
See application file for complete search history.

(56) References Cited

U.S. PATENT DOCUMENTS

2009/0316757 A1* 12/2009 ten Brink ............ H04L 27/2613
375/135
2010/0009688 A1* 1/2010 Lim .................. H04W 74/0866
455/450

FOREIGN PATENT DOCUMENTS

KR  10-2010-0092398 A  8/2010

OTHER PUBLICATIONS

Zhou etc., "An Efficient Random Access Scheme for OFDMA Systems with Implicit Message Transmission", IEEE Transactions on Wireless Communication, vol. 7, No. 7, pp. 2790-2797, Jul. 2008.

* cited by examiner

*Primary Examiner* — Mohammad Anwar
(74) *Attorney, Agent, or Firm* — Rabin & Berdo, P.C.

(57) ABSTRACT

The present invention relates to a data transmitting method using a bandwidth request channel and a user terminal and a base station conducting the same. The present invention provides a communication method by a user terminal which transmits data to a base station via a bandwidth request channel, including: generating a preamble for bandwidth request; determining whether a message for the bandwidth request is generated; generating a first signal value to be operated with the preamble when it is determined that the message is generated and generating a second signal value to be operated with the preamble when it is determined that the message is not generated; operating the preamble with the generated first signal value or second signal value; and transmitting a signal including the operated preamble to the base station, thereby reducing overhead occurring when the bandwidth request information is demodulated.

16 Claims, 7 Drawing Sheets

| | | TIME | | | |
|---|---|---|---|---|---|
| $Pr_0$ | $Pr_4$ | $Pr_8$ | $Pr_{12}$ | $Pr_{16}$ | $Pr_{20}$ |
| $Pr_1$ | $Pr_5$ | $Pr_9$ | $Pr_{13}$ | $Pr_{17}$ | $Pr_{21}$ |
| $M_0$ | $M_6$ | $M_{12}$ | $M_{18}$ | $M_{24}$ | $M_{30}$ |
| $M_1$ | $M_7$ | $M_{13}$ | $M_{19}$ | $M_{25}$ | $M_{31}$ |
| $Pr_2$ | $Pr_6$ | $Pr_{10}$ | $Pr_{14}$ | $Pr_{18}$ | $Pr_{22}$ |
| $Pr_3$ | $Pr_7$ | $Pr_{11}$ | $Pr_{15}$ | $Pr_{19}$ | $Pr_{23}$ |

⋮

FREQUENCY

| | | | | | |
|---|---|---|---|---|---|
| $Pr_0$ | $Pr_4$ | $Pr_8$ | $Pr_{12}$ | $Pr_{16}$ | $Pr_{20}$ |
| $Pr_1$ | $Pr_5$ | $Pr_9$ | $Pr_{13}$ | $Pr_{17}$ | $Pr_{21}$ |
| $M_2$ | $M_8$ | $M_{14}$ | $M_{20}$ | $M_{26}$ | $M_{32}$ |
| $M_3$ | $M_9$ | $M_{15}$ | $M_{21}$ | $M_{27}$ | $M_{33}$ |
| $Pr_2$ | $Pr_6$ | $Pr_{10}$ | $Pr_{14}$ | $Pr_{18}$ | $Pr_{22}$ |
| $Pr_3$ | $Pr_7$ | $Pr_{11}$ | $Pr_{15}$ | $Pr_{19}$ | $Pr_{23}$ |

⋮

| | | | | | |
|---|---|---|---|---|---|
| $Pr_0$ | $Pr_4$ | $Pr_8$ | $Pr_{12}$ | $Pr_{16}$ | $Pr_{20}$ |
| $Pr_1$ | $Pr_5$ | $Pr_9$ | $Pr_{13}$ | $Pr_{17}$ | $Pr_{21}$ |
| $M_4$ | $M_{10}$ | $M_{16}$ | $M_{22}$ | $M_{28}$ | $M_{34}$ |
| $M_5$ | $M_{11}$ | $M_{17}$ | $M_{23}$ | $M_{29}$ | $M_{35}$ |
| $Pr_2$ | $Pr_6$ | $Pr_{10}$ | $Pr_{14}$ | $Pr_{18}$ | $Pr_{22}$ |
| $Pr_3$ | $Pr_7$ | $Pr_{11}$ | $Pr_{15}$ | $Pr_{19}$ | $Pr_{23}$ |

Fig.3

METHOD FOR COMMUNICATING DATA USING BANDWIDTH REQUEST CHANNEL, USER EQUIPMENT AND BASE STATION CONDUCTING THE SAME

CROSS-REFERENCE TO RELATED APPLICATIONS

This application claims priority to and the benefit of Korean Patent Application No. 10-2014-0015818 filed in the Korean Intellectual Property Office on Feb. 12, 2014, the entire contents of which are incorporated herein by reference.

TECHNICAL FIELD

The present invention relates to a communicating method using a bandwidth request channel and a user terminal and a base station conducting the same.

BACKGROUND ART

In a radio access system, in order to transmit uplink data to a base station by a user terminal, a bandwidth needs to be allocated to the user terminal. The user terminal transmits bandwidth request information to the base station via a bandwidth request channel in order to allocate the bandwidth and the base station receives the bandwidth request information and then allocates a bandwidth for uplink data transmission to the user terminal. The base station needs to be connected to a large number of user terminals to perform the above-mentioned bandwidth allocating operation or various communication operations. Therefore, lots of studies for efficient data processing and communication operation between the base station and the user terminal are being conducted.

SUMMARY OF THE INVENTION

The present invention has been made in an effort to provide a communicating method using a bandwidth request channel, and a user terminal and a base station conducting the same which may reduce overhead occurring when bandwidth request information received by a base station is demodulated.

An aspect of exemplary embodiments of the present invention provides a communication method by a user terminal which transmits data to a base station via a bandwidth request channel, including: generating a preamble for bandwidth request; determining whether a message for bandwidth request is generated; generating a first signal value to be operated with the preamble when it is determined that the message is generated and generating a second signal value to be operated with the preamble when it is determined that the message is not generated; operating the preamble with the generated first signal value or second signal value; and transmitting a signal including the operated preamble to the base station.

According to another feature of the present exemplary embodiment, the first signal value and the second signal value may have opposite signs.

According to another feature of the present exemplary embodiment, the first signal value may be 1 and the second signal value may be −1.

According to another feature of the present exemplary embodiment, the operation may be multiplication of the preamble and the first signal value or the second signal value.

Another aspect of exemplary embodiments of the present invention provides a user terminal which transmits data to a base station via a bandwidth request channel, including: a preamble generating unit which generates a preamble for bandwidth request; a message generating unit which generates a message for bandwidth request; a message generation determining unit which determines whether the message is generated and when it is determined that the message is generated, generates a first signal value to be operated with the preamble and when it is determined that the message is not generated, generates a second signal value to be operated with the preamble; an operating unit which operates the preamble with the first signal value or second signal value; and a signal transmitting unit which transmits a signal including the operated preamble to the base station.

According to another feature of the present exemplary embodiment, the message generation determining unit may generate values having opposite signs as the first signal value and the second signal value.

According to another feature of the present exemplary embodiment, the message generation determining unit may generate 1 as the first signal value and generate −1 as the second signal value.

According to another feature of the present exemplary embodiment, the operating unit may perform multiplication on the preamble and the generated first signal value or second signal value.

Yet another aspect of exemplary embodiments of the present invention provides a communication method by a base station which receives data from a user terminal via a bandwidth request channel, including: receiving a signal including a preamble for bandwidth request via the bandwidth request channel from the user terminal; detecting the preamble from the signal; determining whether a message for the bandwidth request is included in the preamble; and demodulating both the preamble and the message when it is determined that the message is included in the signal.

According to another feature of the present exemplary embodiment, the determining whether a message is included may include: calculating a correlation value between the received signal and a preamble sequence which is receivable in the base station; and comparing the correlation value with a reference value.

According to another feature of the present exemplary embodiment, the reference value may be zero.

According to another feature of the present exemplary embodiment, if it is determined that the message is not included in the signal, only the preamble area may be demodulated.

Still another aspect of exemplary embodiments of the present invention provides a base station which receives data from a user terminal via a bandwidth request channel, including: a signal receiving unit which receives a signal including a preamble for bandwidth request via the bandwidth request channel from the user terminal; a preamble detecting unit which detects the preamble from the signal; a message determining unit which determines whether a message for the bandwidth request is included in the preamble; and a demodulating unit which demodulates both the preamble and the message when it is determined that the message is included in the signal.

According to another feature of the present exemplary embodiment, the message determining unit may include a correlation value calculating unit which calculates a correlation value between the received signal and a preamble sequence which is receivable in the base station; and a comparing unit which compares the correlation value with a reference value.

According to another feature of the present exemplary embodiment, the comparing unit may use zero as the reference value.

According to another feature of the present exemplary embodiment, if it is determined that the message is not included in the signal, the demodulating unit may demodulate only the preamble area.

With the above-described configuration, the exemplary embodiments of the present invention may provide a data transmitting method using a bandwidth request channel, and a user terminal and a base station conducting the same which may reduce overhead occurring when bandwidth request information received by a base station is demodulated.

BRIEF DESCRIPTION OF THE DRAWINGS

FIG. 3 is a view illustrating a one physical resource unit of a bandwidth request channel.

DETAILED DESCRIPTION

Figure 1:
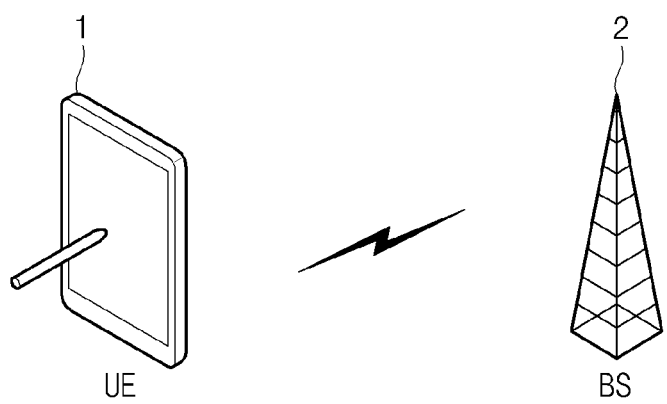
FIG. 1 is a view schematically illustrating a system according to exemplary embodiments of the present invention.

Those skilled in the art may make various modifications to the present invention and the present invention may have various embodiments thereof, and thus specific embodiments will be illustrated in the drawings and described in detail in detailed description. However, this does not limit the present invention within the specific exemplary embodiments, and it should be understood that the present invention covers all the modifications, equivalents and replacements within the spirit and technical scope of the present invention. In describing the present invention, when it is determined that a detailed description of related well-known technology may obscure the gist of the present invention, the detailed description thereof will be omitted.

Hereinafter, exemplary embodiments according to the present invention will be described in detail with reference to the accompanying drawings.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

FIG. 1 is a view schematically illustrating a system according to exemplary embodiments of the present invention. Further, FIG. 2 is a view schematically illustrating a bandwidth request operation between a user terminal 1 and a base station 2 according to exemplary embodiments of the present invention.

Figure 2:
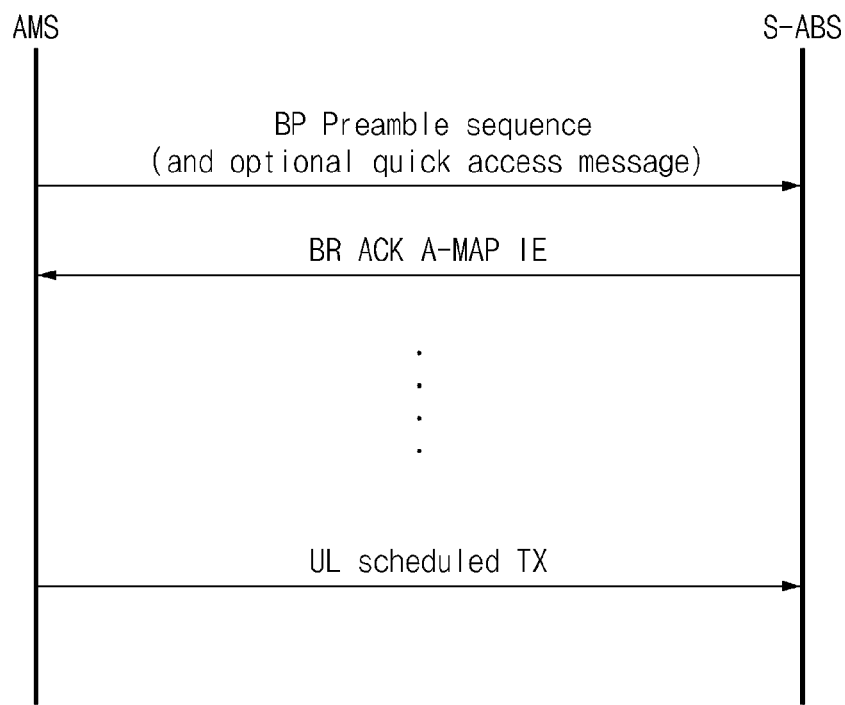
FIG. 2 is a view schematically illustrating a bandwidth request operation between a user terminal and a base station according to exemplary embodiments of the present invention.

Referring to FIGS. 1 and 2, a radio access system according to an exemplary embodiment of the present invention includes a user terminal 1 and a base station 2 and the user terminal 1 and the base station 2 transmit and receive data via an uplink and a downlink.

The user terminal 1 is a device which communicates with another terminal or a server on a network through the base station 2. The user terminal 1 is a concept including UE (user equipment) and an AMS (advanced mobile station) and refers to mobile or fixed user stage equipment. In describing the exemplary embodiments of the present invention, these terminologies are mixed but the user terminal is not limited to a specific device if it is not specifically limited.

The user terminal 1 transmits various types of control information which allows wireless communication to the base station 2 via an uplink control channel. The uplink control channel may include an UL feedback channel, a ranging channel, and a sounding channel. Here, the uplink control channel includes a bandwidth request channel (BW REQ Channel) and the user terminal 1 transmits bandwidth request information to the base station 2 via the bandwidth request channel. The bandwidth request information may include only preamble (BR preamble sequence) but selectively further include a quick access message.

When the user terminal 1 transmits bandwidth request information, the user terminal 1 may perform a predetermined operation on the preamble depending on whether a message is transmitted together with the preamble and then transmit the bandwidth request information to the base station 2. A specific description of the operation which is performed on the preamble will be made below.

The base station 2 may receive the uplink data from the user terminal 1 to perform an operation corresponding to received data or transmit the received data to a device such as another user terminal 1 or a server. The base station 2 refers to a node on the network which is connected to the user terminal 1, such as a BS (base station), an ABS (advanced base station), or an S-ABS (serving advanced base station).

When the base station 2 receives the bandwidth request information which is transmitted from the user terminal 1, the base station 2 may transmit a bandwidth request ACK (BR ACK A-MAP IE) which replies that the bandwidth request is received to the user terminal 1. After transmitting the bandwidth request ACK, the base station 2 allocates the bandwidth for uplink to approve the uplink transmission. The bandwidth request information may be transmitted by the preamble which is transmitted via the bandwidth request channel and as described above, the message may be transmitted together with the preamble.

In the meantime, when the base station 2 receives the bandwidth request information, it is not known whether only the preamble is transmitted or the message is transmitted together with the preamble. Therefore, the base station 2 performs a predetermined operation in order to determine whether the preamble and the message are transmitted together in accordance with the above-mentioned predetermined operation and learns whether the message is transmitted, from the operation result. Specific description of the operation which is performed in the base station 2 will be made below.

The bandwidth request and the bandwidth allocation thereby are performed between the user terminal 1 and the base station 2 so that the user terminal 1 and the base station 2 are connected and data transmission to the uplink (UL Scheduled TX) starts.

Next, a structure of the preamble and the message of the bandwidth request channel will be described.

FIG. 3 is a view illustrating a one physical resource unit of a bandwidth request channel. Here, an example in which IEEE 802.16m system is used as the radio access system will be described. In the IEEE 802.16m system, a physical resource unit (PRU) is formed with a size of 18×6 having 18 adjacent subcarriers as a frequency axis and six OFDM symbols as a time axis. The user terminal 1 may use a contention based random access method in order to transmit the bandwidth request information.

Referring to FIG. 3, one bandwidth request channel may be configured by a one physical resource unit and each bandwidth request channel may be configured by three dispersive bandwidth request tiles in order to obtain frequency diversity. One bandwidth request tile has a six by six configuration including six adjacent subcarriers as a frequency axis and six OFDM symbols as a time axis.

Pr0 to Pr23 are preamble codes and M0 to M35 are messages. In the bandwidth request channel configured as described above, when the base station 2 receives the bandwidth request information, in the related art, a correlation value of the preamble is compared with a predetermined threshold value to detect the preamble. In this case, if it is assumed that the number of detected preamble sequences is a and it is not known whether the message to be transmitted in the preamble sequence, the base station 2 needs to demodulate all the message areas corresponding to the sequences. However, such a situation acts as significant overhead to the base station 2 which needs to demodulate various control channels in addition to the bandwidth request channel within a limited time.

Accordingly, according to the exemplary embodiments of the present invention, the base station 2 can easily understand whether a message is included in the bandwidth request information and if the message is not included, demodulation can be performed only on the preamble area.

In the meantime, in FIG. 3, it is described that the exemplary embodiments of the present invention are applied to the IEEE 802.16m system as an example, but this is only an example and the present invention is not limited thereto. That is, the present invention may be applied to any system as long as in the system, the user terminal 1 and the base station 2 perform the bandwidth request in order to transmit uplink data and the preamble and the message are included in the bandwidth request information which is transmitted in this process.

Next, configurations of the user terminal 1 and the base station 2 will be described in detail.

Figure 4:
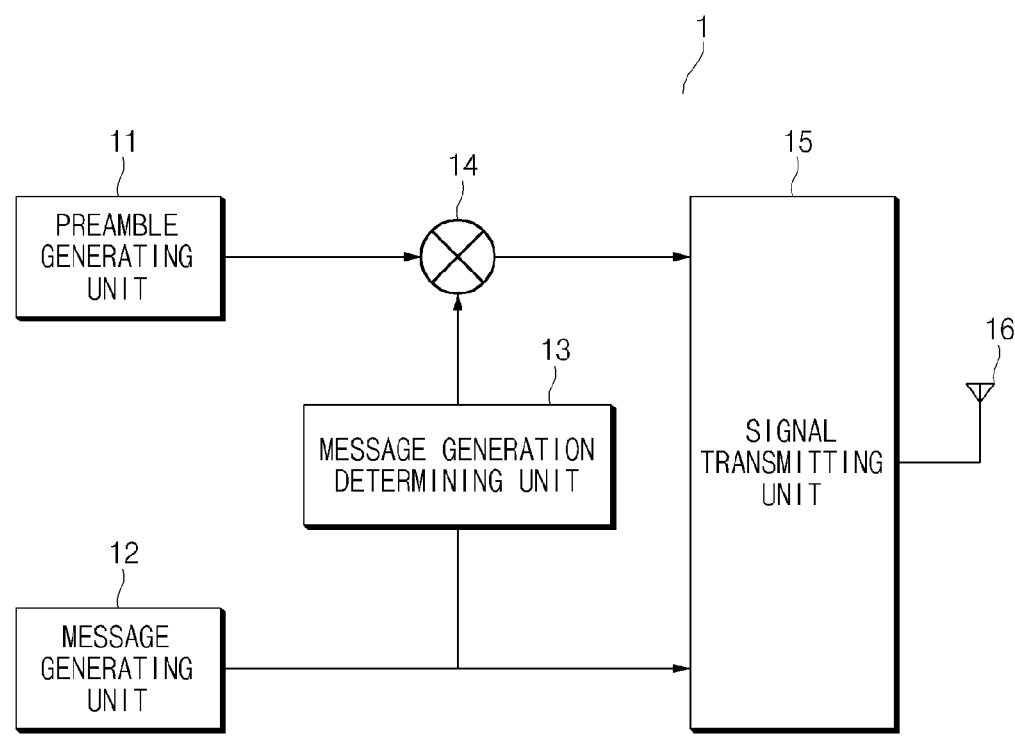
FIG. 4 is a block diagram illustrating a configuration of a user terminal according to an exemplary embodiment of the present invention.

FIG. 4 is a block diagram illustrating a configuration of the user terminal 1 according to an exemplary embodiment of the present invention.

Referring to FIG. 4, the user terminal 1 may include a preamble generating unit 11, a message generating unit 12, a message generation determining unit 13, a signal transmitting unit 15, and a transmission antenna 16.

The preamble generating unit 11 generates a preamble for bandwidth request. The generated preamble may be included in bandwidth request information which is transmitted to the base station 2. The preamble generating unit 11 outputs the generated preamble to an operating unit 14.

The message generating unit 12 generates a message for bandwidth request. However, the message for bandwidth request is a selective configuration as described above, so the message is not necessarily generated. The generated message may be included in the bandwidth request information which is transmitted to the base station 2 together with the preamble. The message generating unit 12 outputs the generated message to the signal transmitting unit 15. Further, the message generating unit 12 outputs a status signal indicating whether the message is generated to the message generation determining unit 13.

The message generation determining unit 13 generates a signal value to be output to the operating unit 14 based on the status signal which is input from the message generating unit 12. The message generation determining unit 13 generates a first signal value to be operated with the preamble when the message generating unit 12 generates a message and generates a second signal value to be operated with the preamble when the message generating unit 12 does not generate a message. The generated first signal value or second signal value is input to the operating unit 14.

In this case, the first signal value may be +1 and the second signal value may be −1. By generating +1 as the first signal value, the preamble which is transmitted as the bandwidth request information is equal to the preamble sequence which is generated in the preamble generating unit 11. Further, by generating −1 as the second signal value, the preamble which is transmitted as the bandwidth request information has the same amplitude and opposite sign to the preamble generated in the preamble generating unit 11.

In this exemplary embodiment, it is described that +1 and −1 are generated as the first signal value and the second signal value, but this is an example, and the present invention is not limited thereto. For example, the first signal value and the second signal value may have opposite signs regardless of the amplitude.

The operating unit 14 performs a predetermined operation on the input preamble and the signal value from the message generation determining unit 13 and outputs the result of the operation to the signal transmitting unit 15. Here, the predetermined operation may be multiplication.

The signal transmitting unit 15 receives and combines the preamble which is operated in the operating unit 14 and the message which is generated in the message generating unit 12 to generate bandwidth request information and then performs modulation which is used in the corresponding system such as an OFDM. The signal transmitting unit 15 transmits the modulated signal to the base station 2 through the transmission antenna 16.

In other words, the user terminal 1 transmits the bandwidth request information to the base station 2 via the bandwidth request channel after multiplying +1 or −1 which corresponds to message transmission on/off and the preamble sequence so that a receiver at the base station 2 may notice whether the message is transmitted.

Figure 5:
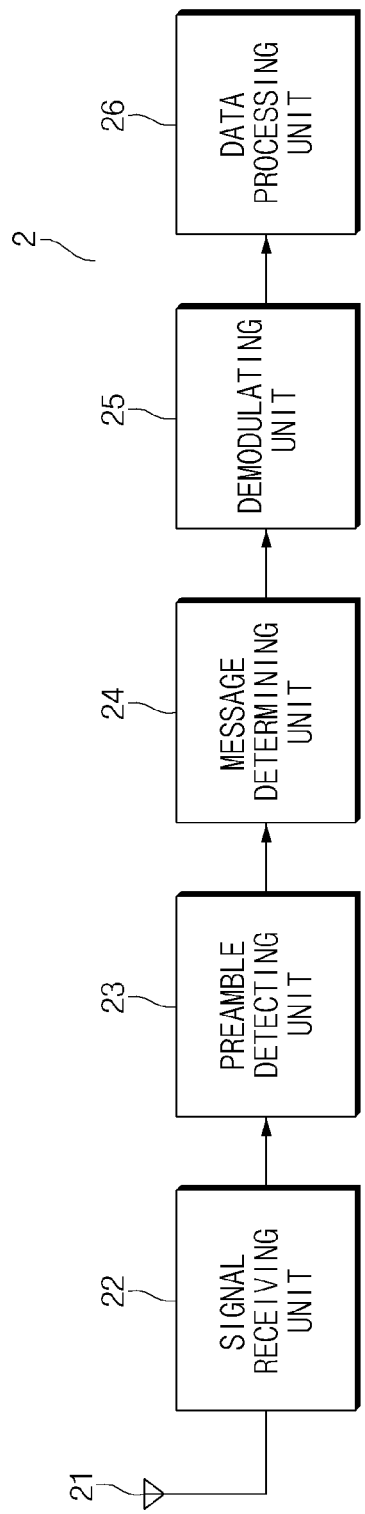
FIG. 5 is a block diagram illustrating a configuration of a base station according to an exemplary embodiment of the present invention.

FIG. 5 is a block diagram illustrating a configuration of the base station 2 according to an exemplary embodiment of the present invention.

Referring to FIG. 5, the base station 2 may include a reception antenna 21, a signal receiving unit 22, a preamble detecting unit 23, a message determining unit 24, a demodulating unit 25, and a data processing unit 26.

A signal which includes the bandwidth request information transmitted from the user terminal 1 may be received through the reception antenna 21. The signal receiving unit 22 selectively outputs a signal from the signal received through the antenna which includes the bandwidth request information so as to process only a subcarrier corresponding to the bandwidth request channel.

The preamble detecting unit 23 calculates a correlation value of a signal which is input from the signal receiving unit 22 and compares the calculated correlation value with a predetermined threshold value to detect a preamble sequence of the bandwidth request channel. Further, the preamble detecting unit 23 calculates correlation with all available preamble sequences and then performs a post-combining processing on a tile and the reception antenna to detect a preamble index.

A signal of the received bandwidth request channel will be represented below.

$$Y_{i,j}(k) = \sum_{u=1}^{N_u} H_{i,j}^u(k) X_{i,j}^u(k) + Z_{i,j}^u(k) \quad \text{[Equation 1]}$$

Here, Nu indicates the number of users, j indicates the number of reception antennas, and i indicates a tile. $X_{i,j}^u$ is a transmission signal and $Z_{i,j}^u$ is a noise.

A process which calculates correlation of a preamble sequence which may be received from the above-described reception signal with all available preamble sequences to find an index having a maximum size will be represented as an equation as follows.

$$\hat{u} = \max_u \left\{ \sum_{i=0}^{T} \sum_{j=0}^{N_R-1} \left| \sum_{k=0}^{N-1} Y_{i,j}(k) P^{u^*}(k) \right| \right\} \quad \text{[Equation 2]}$$

Here, i is a tile index (T is the number of tiles), k is a sequence index (N=24), j is a reception antenna index ($N_R$ is the number of reception antennas), and P(k) is a preamble sequence.

It is determined whether a message of the preamble sequence is transmitted depending on whether a sign of the correlation value corresponding to an index û found as described above is positive (+) or negative (−). This is represented by the following equation.

$$\text{Msg\_onoff}(\hat{u}) = 1 \quad \text{when} \sum_{i=0}^{T} \sum_{j=0}^{N_R-1} \sum_{k=0}^{N-1} Y_{i,j}(k) P^{u^*}(k) > 0 \quad \text{[Equation 3]}$$
$$= -1 \quad \text{otherwise}$$

That is, only the difference between Equation 2 and Equation 3 is a part for obtaining an absolute value. Therefore, the preamble detecting unit 23 does not calculate the absolute value for the correlation value in an actual calculating process but uses the correlation value as it is to perform a summation operation on the tile T and the reception antenna $N_R$ to obtain a Msg_onoff(û) value.

When the Msg_onoff(û) value is 1, the message determining unit 24 determines that the preamble is multiplied by +1 when the user terminal 1 transmits the bandwidth request information and thus determines that the message is transmitted together. In contrast, when the Msg_onoff(û) value is −1, the message determining unit 24 determines that the preamble is multiplied by −1 when the user terminal 1 transmits the bandwidth request information and thus determines that the message is not included in the bandwidth request information.

The demodulating unit 25 demodulates the received signal in accordance with the determination result of the message determining unit 24. That is, when the message determining unit 24 determines that the bandwidth request information in which the message is included is received, the demodulating unit 25 demodulates an entire area of the bandwidth request information. In contrast, when the message determining unit 24 determines that the bandwidth request information in which the message is not included is received, the demodulating unit 25 demodulates only the preamble area.

The data processing unit 26 performs various data processings required for the signal demodulated in the demodulating unit 25.

With the above-described configuration, the base station 2 may detect whether a message other than the preamble is included in the bandwidth request information which is transmitted by the user terminal 1 by using a configuration of the related art which is used for calculating the correlation value as it is, without having additional hardware or software. Therefore, a cost for providing an additional configuration may be saved while reducing the overhead occurring when a large amount of signals are demodulated.

Figure 6:
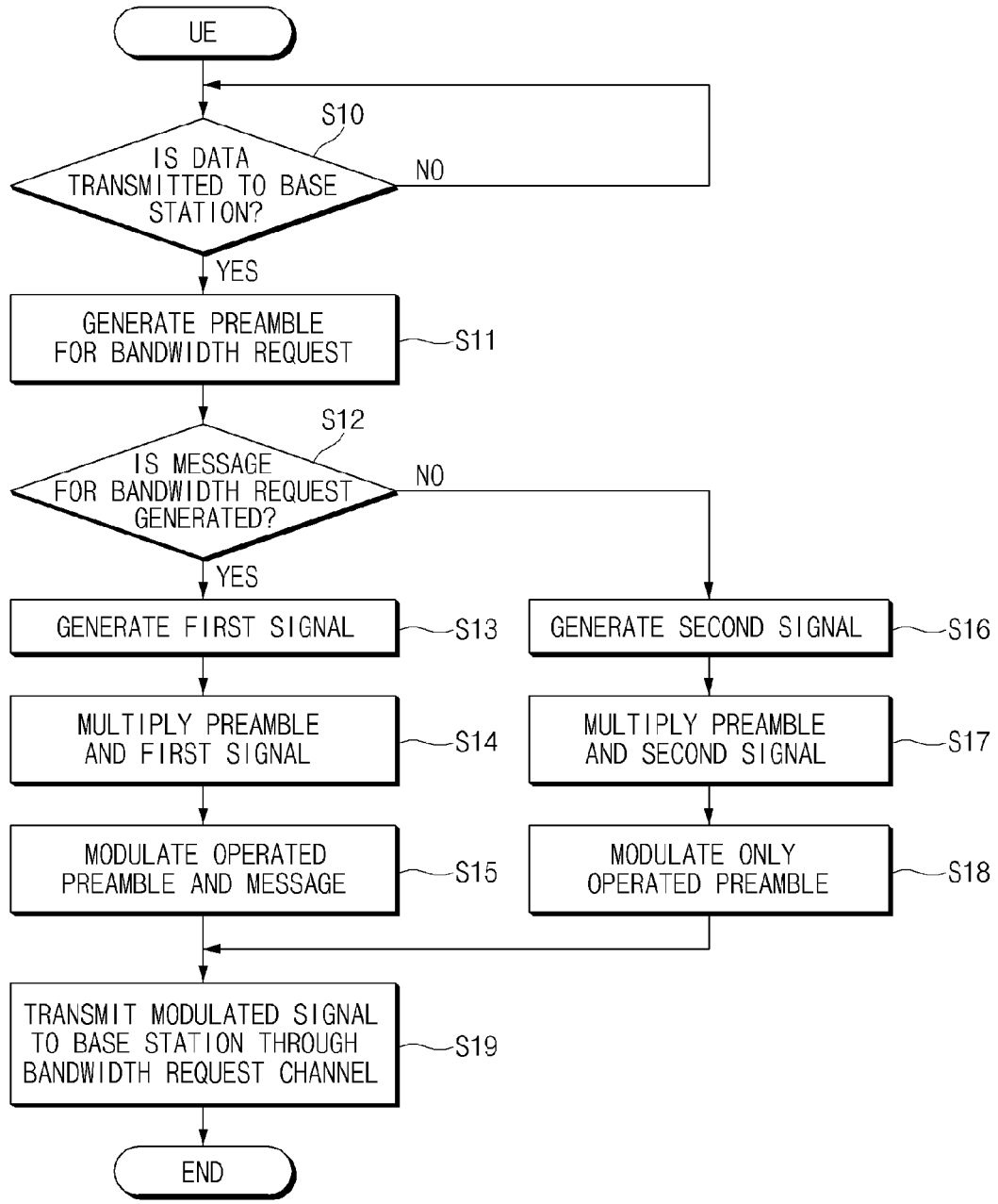
FIG. 6 is a flowchart illustrating an operation of a user terminal according to an exemplary embodiment of the present invention.

FIG. 6 is a flowchart illustrating an operation of the user terminal 1 according to an exemplary embodiment of the present invention.

Referring to FIG. 6, the user terminal 1 determines whether to transmit data to the base station 2 in step S10. When the data is not transmitted (No in step S10), the operation in step S10 is continuously performed. When the user terminal 1 wants to transmit the data (Yes in step S10), the preamble generating unit 11 generates a preamble for bandwidth request in step S11.

Next, it is determined whether a message for bandwidth request is generated in step S12. When it is determined that the message is generated (Yes in step S12), the message generation determining unit 13 generates a first signal in step S13 and when it is determined that the message is not generated (No in step S12), the message generation determining unit 13 generates a second signal in step S16.

When the first signal is generated, the operating unit 14 performs a multiplication operation on the generated preamble and the generated first signal and outputs the multiplication result to the signal transmitting unit 15 in step S14 and the signal transmitting unit 15 combines the operated preamble and the message to generate as bandwidth request information to perform modulation in step S15. The modulated signal is transmitted to the base station 2 via the bandwidth request channel in step S19.

In the meantime, if it is determined that the message is not generated and the second signal is generated in step S12, the operating unit 14 multiplies the generated preamble and the generated second signal to output the multiplication result to the signal transmitting unit 15 in step S17. Only operated preamble is input to the signal transmitting unit 15 so that the preamble is modulated in step S18 to be transmitted to the base station 2 in step S19.

Figure 7:
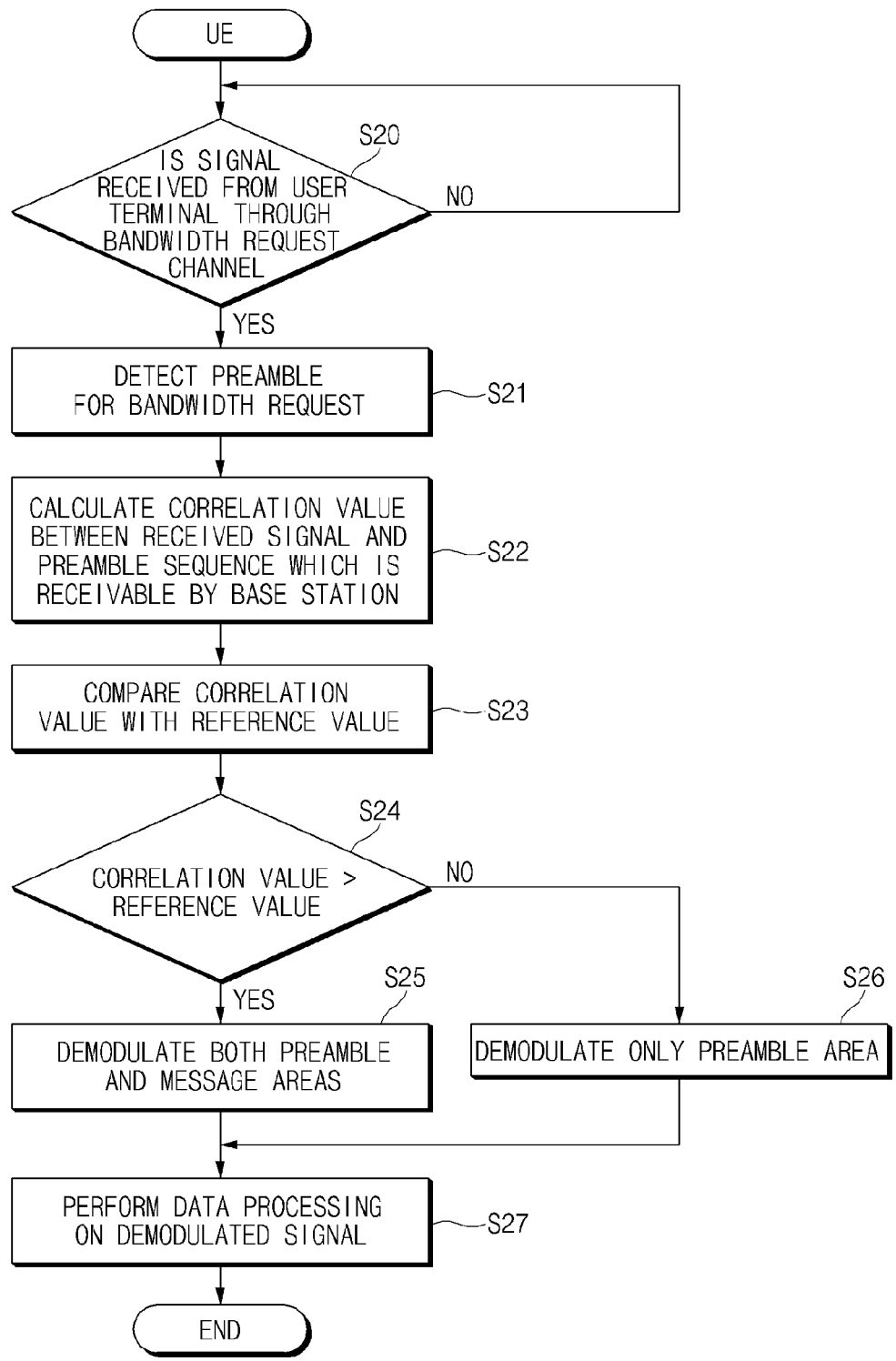
FIG. 7 is a flowchart illustrating an operation of a base station according to an exemplary embodiment of the present invention.

FIG. 7 is a flowchart illustrating an operation of the base station 2 according to an exemplary embodiment of the present invention.

Referring to FIG. 7, the base station 2 determines whether bandwidth request information is received from the user terminal 1 via the bandwidth request channel in step S20. When the bandwidth request information is not received (No in step S20), the operation in step S20 is continuously performed. In contrast, when the bandwidth request information is received (Yes in step S20), a preamble for bandwidth request is detected in step S21.

Next, the preamble detecting unit 23 calculates a correlation value between the received signal and a preamble sequence which is receivable by the base station in step S22 and compares a calculated correlation value with a reference value in step S23. When the correlation value is larger than the reference value (Yes in step S24), it is determined that both the preamble and the message are included in the bandwidth request information and thus the entire area of the preamble and the message is demodulated in step S25. In contrast, when it is determined that the correlation value is not larger than the reference value (No in step S24), it is determined that only preamble is included in the bandwidth request information and only the preamble area is demodulated in step S26. The data processing unit 26 performs the data processing on the demodulated signal.

The preamble detecting operation and the message determination detecting operation by the preamble detecting unit 23 and the message determining unit 24 have been described in FIG. 5 and thus the detailed description thereof will be omitted.

According to the above method, the base station 2 may detect whether a message other than the preamble is included in the bandwidth request information which is transmitted by the user terminal 1 by using a configuration of the related art which is used for calculating the correlation value as it is, without having additional hardware or software. Therefore, a cost for providing an additional configuration may be saved while reducing the overhead occurring when a large amount of signals are demodulated.

However, the method according to the present invention as described above may be created by a computer program. A code and a code segment which configure the program may be easily deducted by a computer programmer in the art. Further, the created program is stored in a computer readable recording medium (information storage medium) and read and executed by a computer to implement the method of the present invention. The recording medium includes all types of computer readable recording media.

In the present invention, various substitutions, modifications, and changes can be made departing from the technical spirit of the present invention by those skilled in the art, and as a result, the present invention is not limited to the aforementioned embodiments and the accompanying drawings.

What is claimed is:

1. A communication method by a user terminal which transmits data to a base station via a bandwidth request channel, the method comprising:
generating a preamble for bandwidth request;
determining whether a message for the bandwidth request is generated;
generating a first signal value to be operated on the preamble when it is determined that the message is generated and generating a second signal value to be operated on the preamble when it is determined that the message is not generated;
operating on the preamble with the generated first signal value or second signal value; and
transmitting a signal including the operated preamble to the base station.

2. The method of claim 1, wherein the first signal value and the second signal value have opposite signs.

3. The method of claim 1, wherein the first signal value is 1 and the second signal value is −1.

4. The method of claim 1, wherein the operation is multiplication of the preamble and the first signal value or the second signal value.

5. A user terminal which transmits data to a base station via a bandwidth request channel, the user terminal comprising:
a preamble generating unit which generates a preamble for bandwidth request;
a message generating unit which generates a message for bandwidth request;
a message generation determining unit which determines whether the message is generated and when it is determined that the message is generated, generates a first signal value to be operated on the preamble and when it is determined that the message is not generated, generates a second signal value to be operated on the preamble;
an operating unit which operates on the preamble with the first signal value or the second signal value; and
a signal transmitting unit which transmits a signal including the operated preamble to the base station.

6. The user terminal of claim 5, wherein the message generation determining unit generates values having opposite signs as the first signal value and the second signal value.

7. The user terminal of claim 5, wherein the message generation determining unit generates 1 as the first signal value and generates −1 as the second signal value.

8. The user terminal of claim 5, wherein the operating unit performs multiplication on the preamble and the generated first signal value or second signal value.

9. A communication method by a base station which receives data from a user terminal via a bandwidth request channel, the method comprising:
receiving a signal including a preamble for bandwidth request via the bandwidth request channel from the user terminal;
detecting the preamble from the signal;
determining whether a message for the bandwidth request is included in the preamble according to information in the preamble; and
demodulating both the preamble and the message when it is determined that the message is included in the signal.

10. The method of claim 9, wherein the determining whether a message is included includes:
calculating a correlation value between the received signal and a preamble sequence which is receivable in the base station; and
comparing the correlation value with a reference value.

11. The method of claim 10, wherein the reference value is zero.

12. The method of claim 9, wherein if it is determined that the message is not included in the signal, only the preamble area is demodulated.

13. A base station which receives data from a user terminal via a bandwidth request channel, the base station comprising:
a signal receiving unit which receives a signal including a preamble for bandwidth request via the bandwidth request channel from the user terminal;
a preamble detecting unit which detects the preamble from the signal;
a message determining unit which determines whether a message for the bandwidth request is included in the preamble according to information in the preamble; and a demodulating unit which demodulates both the preamble and the message when it is determined that the message is included in the signal.

14. The base station of claim 13, wherein the message determining unit includes:
   a correlation value calculating unit which calculates a correlation value between the received signal and a preamble sequence which is receivable in the base station; and
   a comparing unit which compares the correlation value with a reference value.

15. The base station of claim 14, wherein the comparing unit uses zero as the reference value.

16. The base station of claim 13, wherein if it is determined that the message is not included in the signal, the demodulating unit demodulates only the preamble area.

* * * * *